(12) United States Patent
Poellmann et al.

(10) Patent No.: US 7,435,857 B2
(45) Date of Patent: Oct. 14, 2008

(54) METHOD FOR PRODUCING PURE α-ALKOXY-Ω-HYDROXY-POLYALKYLENE GLYCOLS

(75) Inventors: Klaus Poellmann, Burghausen (DE);
Anton Strasser, Altoetting (DE);
Reinhard Vybiral, Burgkirchen (DE);
Rainer Wagner, Burgkirchen (DE)

(73) Assignee: Clariant Produkte (Deutschland) GmbH, Frankfurt (DE)

( * ) Notice: Subject to any disclaimer, the term of this patent is extended or adjusted under 35 U.S.C. 154(b) by 0 days.

(21) Appl. No.: 11/792,768

(22) PCT Filed: Nov. 25, 2005

(86) PCT No.: PCT/EP2005/012622

§ 371 (c)(1),
(2), (4) Date: Jun. 8, 2007

(87) PCT Pub. No.: WO2006/061110

PCT Pub. Date: Jun. 15, 2006

(65) Prior Publication Data

US 2008/0076947 A1 Mar. 27, 2008

(30) Foreign Application Priority Data

Dec. 10, 2004 (DE) .................. 10 2004 059 489

(51) Int. Cl.
*C07C 43/13* (2006.01)
(52) U.S. Cl. .................. 568/618; 568/606; 568/613
(58) Field of Classification Search ................ 568/618, 568/606, 613
See application file for complete search history.

(56) References Cited

U.S. PATENT DOCUMENTS

| 5,661,020 | A | 8/1997 | Snow |
| 6,166,112 | A | 12/2000 | Hirata |
| 2003/0073873 | A1 | 4/2003 | Brons |

FOREIGN PATENT DOCUMENTS

| DE | 3121929 | 8/1997 |
| EP | 0884290 | 12/1998 |
| EP | 1295902 | 3/2003 |
| WO | 00012577 | 3/2000 |

OTHER PUBLICATIONS

English Lang. Translation of IPER for PCT/EP2005/012622, mailed 2007-06013.
English language Abstract for DE3121929, Feb. 24, 1983.
Harris, JM, "Introduction to Biotechnical and Biomedical Applications of Poly(Ethylene Glycol)", Plenum Press(New York), (1992).
Voronese et al., "Preparation and Properties of Monomethoxypoly(Ethylene Glycol)-Modified Enzymes", Polyethylene Glycol Chemistry, ed. J. Milton Harris, Plenum Press, (New York), (1992).
Selisko, B., et al., "Analysis and Purification of Monomethoxy-Polyethylene Glycol by Vesicle and Gel Permeation Chromatography", Jour. of Chromatography, No. 641, (1993), p. 71-79.
Encyclopedia of Polymer Science and Eng., Wiley & Sons, vol. 2, p. 1 (1986).
Copending Application—U.S. Appl. No. 11/975,467, filed Oct. 19, 2007.
International Search Report PCT/EP2005/012622, mailed Apr. 18, 2006.
English Language Abstract of JP6248070 A, Sep. 6, 1994.

*Primary Examiner*—Elvis O Price
(74) *Attorney, Agent, or Firm*—Richard P. Silverman

(57) ABSTRACT

The invention relates to a method for producing pure alpha-alkoxy-Ω-hydroxy-polyalkylene glycols, creating small impurities of the product on high-molecular a-Ω-di-hydroxy-polyalkylene glycols. The method is based on the use of high-boiling initiator alcohols of the following general structure $R_2$—$(OCH_2CHR)_k$—OH wherein $R_2$ represents an alkyl radical comprising between 1 and 4 C atoms, preferably $R_2=CH_3$, k represents a number between 1 and 10, preferably between 1 and 4, and R represents H, $CH_3$ or an alkyl radical comprising between 2 and 4 C atoms, preferably R=H, $CH_3$. The use of the cited initiator alcohols enables the mixture of a basic catalyst and an initiator alcohol to be dried in such a way that it has a very low water content, and thus to produce very low concentrations of unwanted a-Ω-di-hydroxy-polyalkylene glycol impurities.

9 Claims, No Drawings

METHOD FOR PRODUCING PURE α-ALKOXY-Ω-HYDROXY-POLYALKYLENE GLYCOLS

"This application is a 371 of PCT/EP05/12622, filed Nov. 25, 2005, which claims benefit to foreign application DE 10 2004 059 489.9, filed Dec. 10, 2004."

The present invention relates to a process for preparing high molecular weight α-alkoxy-Ω-hydroxypolyalkylene glycols, by which these products can be prepared essentially free of dihydroxy-functional polyalkylene glycol impurities and with very high molar masses.

Polyalkylene glycols are prepared generally by anionic, ring-opening polymerization of epoxides (ethylene oxide, propylene oxide, butylene oxide) with alcohols as initiators according to the following reaction equation (see Encyclopedia of Polymer Science and Engineering, Wiley+Sons, Vol. 2, p. 1). In this reaction, an alkoxide anion which is formed by reaction of the initiator alcohol with bases functions as the reactive species. With R'—OH=methanol and sodium hydroxide as the basic catalyst, this forms, for example, α-methoxy-Ω-hydroxypolyalkylene glycols:

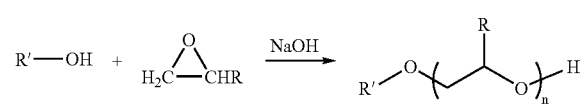

High molecular weight α-alkoxy-Ω-hydroxypolyalkylene glycols with short α-alkoxy groups ($C_1$-$C_4$, preferably $C_1$, i.e. R'—OH=methanol) are used to a large degree for producing dispersants and flow improvers based on polyalkylene glycol. In the first step, a copolymerizable macromonomer is prepared from the α-alkoxy-Ω-hydroxypolyalkylene glycols by esterifying with an unsaturated carboxylic acid, for example methacrylic acid, and is subsequently copolymerized with a multitude of possible monomers to give the resulting polymeric dispersant/flow improver (WO-00/012 577 and EP-A-0 884 290).

A problem in the use of α-alkoxy-Ω-hydroxypolyalkylene glycols for the preparation of polymeric dispersants is found to be their content of contaminating α, Ω-dihydroxypolyalkylene glycols which are formed according to the following equation as a side reaction in the preparation of α-alkoxy-Ω-hydroxypolyalkylene glycols according to equation 1 (J. M. Harris, Polyethylene Glycol Chemistry, Plenum Press, p. 2), since these α,Ω-dihydroxypolyalkylene glycols form diesters with crosslinking action in the esterification with unsaturated carboxylic acids:

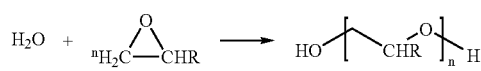

α-Alkoxy-Ω-hydroxypolyalkylene glycols likewise serve as reagents for the so-called PEG-ylation of protein pharmaceuticals in order to increase their half-life in serum or to suppress the immune reaction (Veronese et. al. p. 127 ff in J. M. Harris, Polyethylene Glycol Chemistry, Plenum Press, 1992). For this purpose, α-alkoxy-Ω-hydroxypolyalkylene glycols are activated by reactive groups and coupled to proteins. Here too, the α,Ω-dihydroxypolyalkylene glycols formed according to equation 2 are troublesome, since they form α,Ω-diactivated polyalkylene glycols in the activation reaction, which lead to crosslinking and insolubility of the PEG-ylated proteins (US 1992-936416).

The α,Ω-dihydroxypolyalkylene glycols formed as an impurity can be detected analytically since their molar mass is significantly higher than that of the α-alkoxy-Ω-hydroxypolyalkylene glycols. This is caused by the fact that every reactive OH group grows with the same reaction rate in the anionic polymerization of the epoxides. The buildup in the molar mass therefore proceeds twice as fast for the α,Ω-dihydroxypolyalkylene glycols owing to the two reactive OH end groups as for the α-alkoxy-Ω-hydroxypolyalkylene glycols which have only one reactive end group. Accordingly, impurities of α,Ω-dihydroxypolyalkylene glycols in α-alkoxy-Ω-hydroxypolyalkylene glycols can be determined by means of GPC analysis with reference to the area ratios of the peaks of the high molecular weight impurity and of the peaks of the α-alkoxy-Ω-hydroxypolyalkylene glycols. Analyses of commercially available α-methoxy-Ω-hydroxypolyalkylene glycols by means of GPC (Selisko, Delgado, Fisher in Journal of Chromatography 641, 1993, 71-79) have determined up to 22.9% (α,Ω-dihydroxypolyalkylene glycol with molar mass 9280 in an α-methoxy-Ω-hydroxypolyalkylene glycol with molar mass 5970 g/mol.

Typically, α-alkoxy-Ω-hydroxypolyalkylene glycols with short α-alkoxy groups ($C_1$-$C_4$-alkoxy) are prepared by base-catalyzed alkoxylation of a $C_1$-$C_4$-alcohol used as an initiator alcohol (R'—OH), for example methanol or ethanol, with low vapor pressure and low boiling point. The basic catalysts used are alkali metal or alkaline earth metal hydroxides (MOH) (EP 0884290 A2) which form the corresponding alkoxide from the alcohol to be alkoxylated according to the following equation:

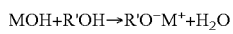

Unfortunately, this forms water as a by-product which, in the reaction with the epoxides, forms the undesired impurities, α,Ω-dihydroxypolyalkylene glycols. Owing to the low boiling point of the $C_1$-$C_4$ alcohols used as R'—OH, it is not immediately possible to remove the water formed by distillation before the epoxide is metered in. The use of alkali metal alkoxide, for example sodium methoxide (DE-A-3 121 929), as a basic catalyst also only solves the problem unsatisfactorily, since the alkali metal methoxide, owing to the preparation process and the high hygroscopicity, is never completely free of alkali metal hydroxide, which again forms water in the reaction system by the above equation.

For this reason, it was therefore an object of the present invention to prepare α-alkoxy-Ω-hydroxypolyalkylene glycols with short α-alkoxy groups and molar masses of 1000-5000 g/mol, which are largely free of α,Ω-dihydroxypolyalkylene glycols and do not have the aforementioned disadvantages.

The invention provides a process for preparing compounds of the formula 1

by reacting compounds of the formula 2

in which $R_2$ is an alkyl radical having from 1 to 4 carbon atoms, k is from 1 to 10, R is H, $CH_3$ or an alkyl radical having from 2 to 4 carbon atoms and n is from 200 to 800, by adding a basic catalyst to the compound of the formula 2, removing the water from the mixture thus obtained and alkoxylating the mixture.

The invention further provides a mixture comprising, as well as a major proportion of a compound of the formula 1, between 1 and 200 ppm of a compound of the formula 3

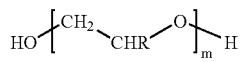

in which R is as defined above and m is from 1 to 1000.

It is essential that the initiator alcohol of the formula 2 has a higher boiling point/lower vapor pressure than water, so that complete distillative water removal/drying is possible after the reaction of the alcohol and before addition of the epoxide. When the inventive initiator alcohols are used, the water content in the basic catalyst is unimportant. It is likewise unimportant whether basic catalyst used an alkali metal alkoxide or an alkali metal hydroxide, since it is possible to remove water from the reaction medium by distillation before addition of the epoxide. The inventive initiator alcohol of the formula 2 should only have small contents of di- or polyhydroxy-functional impurities. A small content is considered to be a content of 500 ppm.

The process according to the invention is preferably based on the following steps:

1. The initiator alcohol of the formula 1 is initially charged in the alkoxylation reactor.
2. The basic catalyst is added.
3. The initiator alcohol/base mixture is dried under reduced pressure at elevated temperature down to minimum water contents; the water content is preferably below 500 ppm.
4. The epoxide, preferably ethylene oxide, which should have a low water content of preferably at most 50 ppm, is metered in the amount needed to achieve the specified molar mass with cooling of the reaction mixture, such that the specified reaction temperature of 140° C. is maintained.
5. The resulting α-alkoxy-Ω-hydroxypolyalkylene glycol is neutralized with an acid, and the molar mass and the content of α,Ω-dihydroxypolyalkylene glycols are determined by means of GPC analysis.

The examples which follow further illustrate the invention.

EXAMPLE 1

180 g of diethylene glycol monomethyl ether (1.5 mol), which had been purified carefully and had less than 0.01% by weight of impurities, were initially charged in a pressure reactor. After addition of 1 g of NaOH, drying was effected at 90° C. under reduced pressure until a water content of 0.01% by weight had been attained. Subsequently, 4320 g (98.2 mol) of ethylene oxide with a water content of 40 ppm were metered in at a temperature of 130° C. and a pressure of approx. 9 bar up to a theoretical molar mass of 3000 g/mol. The reaction was stopped by adding acetic acid and the product was analyzed by means of GPC. The main peak 1, which can be assigned to α-methoxy-Ω-hydroxy-polyethylene glycol, was at a molar mass of 2970 g/mol. In addition, a peak 2 in the molar mass range of 5000-7000 g/mol was detected, which was assigned to α,Ω-dihydroxypolyethylene glycol. The peak area ratio is peak 1/peak 2=100/1.3.

EXAMPLE 2

55.54 g of diethylene glycol monomethyl ether (0.463 mol), which had been purified carefully by distillation and had less than 0.01% by weight of impurities, was initially charged in a pressure reactor. After addition of 0.704 g of sodium methoxide, the mixture was dried at 80° C. under reduced pressure until a water content of 0.01% by weight had been attained. Subsequently, 2486 g (56.5 mol) of ethylene oxide with a water content of 40 ppm were metered in at a temperature of 140° C. and a pressure of approx. 9 bar up to a theoretical molar mass of 5490 g/mol. The reaction was stopped by adding acetic acid and the product was analyzed by means of GPC. The main peak 1, which can be assigned to α-methoxy-Ω-hydroxypolyethylene glycol, was at a molar mass of 5290 g/mol. In addition, a peak 2 in the molar mass range of 9000-12000 g/mol was detected, which was assigned to α,Ω-dihydroxypolyethylene glycol. The peak area ratio is peak 1/peak 2=100/1.4.

COMPARATIVE EXAMPLE 1

According to EP 0 884 290

32 g of methanol (1 mol), which had been purified carefully by distillation and had less than 0.02% by weight of impurities, were initially charged in a pressure reactor. After addition of 3.3 g of NaOH, 4968 g (56.5 mol) of ethylene oxide with a water content of 40 ppm were metered in directly at a temperature of from 80 to 150° C. and a pressure of approx. 9 bar up to a theoretical molar mass of 5000 g/mol. Drying of the methanol/NaOH mixture was not possible here owing to the low boiling point of methanol. The reaction was stopped by adding acetic acid and the product was analyzed by means of GPC. The main peak 1, which can be assigned to α-methoxy-Ω-hydroxypolyethylene glycol, was at a molar mass of 4020 g/mol. In addition, a peak 2 in the molar mass range of 7000-9000 g/mol was detected, which was assigned to α,Ω-dihydroxypolyethylene glycol. The peak area ratio is peak 1/peak 2=100/15.

The invention claimed is:

1. A process for preparing a compound of the formula 1

$$R_2-(O-CH_2-CHR)_n-OH \quad (1)$$

by reacting an initiator alcohol of the formula 2

$$R_2-(O-CH_2-CHR)_k-OH \quad (2)$$

in which $R_2$ is an alkyl radical having from 1 to 4 carbon atoms, k is from 1 to 10, R is H, $CH_3$ or an alkyl radical having from 2 to 4 carbon atoms and n is from 200 to 800, by adding a basic catalyst to the initiator alcohol of the formula 2 to provide a mixture, removing water from the mixture to provide a dry mixture and adding an epoxide and alkoxylating the dry mixture.

2. The process as claimed in claim 1, in which the boiling point of the initiator alcohol $R_2-(OCH_2-CHR)_k-OH$ is greater than the boiling point of water.

3. The process as claimed in claim 1, in which the initiator alcohol contains less than 500 ppm of di- or polyhydroxy-functional compounds.

4. The process of claim 1, in which the initiator alcohol is $CH_3(OCH_2CH_2)_kOH$.

5. The process of claim 1, in which the mixture of initiator alcohol and basic catalyst is dried by distillation to water contents of less than 500 ppm before the epoxide is added.

6. The process of claim 1, in which the temperature and pressure conditions used for drying are selected such that the initiator alcohol used does not yet boil but water distils off.

7. The process of claim 1, in which the epoxide added has a water content of less than 50 ppm.

8. The process of claim 1, in which the epoxide added is ethylene oxide.

9. A mixture comprising, as well as a major proportion of a compound of the formula 1, $$R_2-(O-CH_2-CHR)_n-OH \qquad (1)$$

between 1 and 200 ppm of a compound of the formula 3

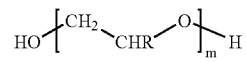

in which R is as defined above and m is from 1 to 1000.

* * * * *